United States Patent [19]
Camp, Jr.

[11] 3,708,275
[45] Jan. 2, 1973

[54] MANUFACTURE OF ALKALI METAL PHOSPHATES

[75] Inventor: Ernest C. Camp, Jr., Barrington, N.J.

[73] Assignee: Cities Service Company, New York, N.Y.

[22] Filed: Oct. 28, 1970

[21] Appl. No.: 84,907

Related U.S. Application Data

[63] Continuation-in-part of Ser. No. 725,139, April 29, 1968, Pat. No. 3,563,703.

[52] U.S. Cl. ............................71/1, 71/34, 71/35, 71/36, 423/309, 423/399
[51] Int. Cl. ..............................................C05b 7/00
[58] Field of Search.........71/35, 36, 1, 34; 23/102 A, 23/107, 203 N; 423/309, 313, 399, 386

[56] References Cited

UNITED STATES PATENTS

| | | | |
|---|---|---|---|
| 3,579,323 | 5/1971 | Gauster et al. | 71/35 |
| 3,062,617 | 11/1962 | Beekhius | 23/102 A |
| 3,600,152 | 8/1971 | Drechsel et al. | 71/34 |
| 3,244,500 | 5/1966 | Stinson et al. | 71/34 X |
| 3,414,375 | 12/1968 | Leroy et al. | 23/107 X |
| 3,347,656 | 10/1967 | Potts et al. | 71/36 |
| 3,607,018 | 9/1971 | Moore | 23/107 |
| 2,888,321 | 5/1959 | Baumann | 23/107 |
| 3,554,729 | 1/1971 | Curless | 71/36 X |
| 3,375,062 | 3/1968 | Curless | 23/102 A |
| 3,010,818 | 11/1961 | Jones et al. | 71/37 |
| 3,574,591 | 4/1971 | Lyons et al. | 71/36 X |

FOREIGN PATENTS OR APPLICATIONS

| | | | |
|---|---|---|---|
| 1,082,963 | 1/1963 | Japan | 71/36 |
| 613,794 | 1/1961 | Canada | 23/102 A |
| 1,447,996 | 12/1964 | France | 23/102 A |

*Primary Examiner*—Reuben Friedman
*Assistant Examiner*—Richard Barnes
*Attorney*—J. Richard Geaman, Elton F. Gunn and Joshua J. Ward

[57] ABSTRACT

Alkali metal phosphates can be prepared by adding an alkali metal halide to a solution of phosphoric and nitric acids. The resulting gases can be recovered. After removal of halogen, as by boiling, the solution can be adjusted in nitric acid content and neutralized to yield a fertilizer. Alternatively, the solution can be substantially denitrated, yielding an alkali metal phosphate. Additionally, after denitration the resulting residue can be calcined to yield a water soluble fertilizer. Micronutrients incorporated in the phosphoric acid-nitric acid solution also can be rendered water soluble by this process.

14 Claims, No Drawings

MANUFACTURE OF ALKALI METAL PHOSPHATES

CROSS-REFERENCE TO RELATED APPLICATIONS

This application is a continuation in part of my copending application Ser. No. 725,139 entitled, "Improved Process for Treating Phosphate Rock" filed Apr. 29, 1968, and assigned to the same assignee as the present application and now U.S. Pat. No. 3,563,703.

BACKGROUND OF THE INVENTION

This invention relates to an improvement in the preparation of alkali metal phosphates. There is at present a great need for an economical process which will produce alkali metal phosphates, such as potassium phosphates, at a cost sufficiently low to permit their use as fertilizers. Presently, technical grade alkali metal phosphates are made commercially from wet process phosphoric acid using the alkali metal hydroxide or carbonate. The naturally occurring alkali metal compounds, however, such as those of sodium and potassium, are most commonly mined and recovered in the form of a salt, such as the chloride. Thus, in order to react phosphoric acid with an alkali metal hydroxide or carbonate, the alkali metal salt must first be converted to the corresponding hydroxide or carbonate. Unfortunately, however, the cost of these converted materials is too expensive for fertilizer production. It is thus readily apparent that a process for preparing alkali metal phosphates which employs the alkali metal salt directly, eliminating expensive intermediate processing, would be a highly desirable and economically attractive process.

The prior art has recognized the desirability of directly producing alkali metal phosphates from such inexpensive compounds as the corresponding alkali metal salt, such as the chloride. Exemplary of such prior art are U. S. Pat. No. 2,954,286 to John K. Radley et al. and U. S. Pat. No. 3.010,817 to Eugene D. Crittenden. Radley in Pat. No. 2,954,268 teaches a process for making a fertilizer which involves reacting potassium chloride and nitric acid to produce a liquid product containing free nitric acid, removing the formed nitrosyl chloride and chlorine and treating the product with phosphoric acid. Crittenden in U. S. Pat. No. 3,010,817 teaches that potassium phosphate fertilizers may be prepared by feeding potassium chloride to a reactor for reaction with nitric acid and water. Following the reaction, chlorine and nitrosyl chloride are separated, leaving an effluent containing mostly potassium nitrate, nitric acid and water. This effluent is then fed to a mixing vessel to which sulfuric acid and phosphoric acid are added, and this mixture is finally supplied to leach phosphate rock.

In each of the above cases the alkali metal salt is first reacted with nitric acid and the reaction product is then combined with phosphate, either by treating with phosphoric acid or by subsequent contact with phosphate rock. The disadvantages of these prior art processes are manifest when compared with the desirability of directly obtaining the desired product. In one case, the phosphoric acid must first be formed and thereafter combined with the reaction product of nitric acid and alkali metal salt. In the second case, potassium nitrate is mixed with sulfuric acid and phosphate rock, to result in a mixture which is taught to be relatively low in total plant food and which contains, as a result of the acidulation of phosphate rock, substantial amounts of calcium, which often is not desirable. One advantage of the present process is that it provides an integrated process for the nitric acid acidulation of phosphate rock, subsequent treatment of the acidulate to remove calcium, the treatment of the calcium-free solution with an alkali metal salt to form the corresponding phosphate, and recovery or subsequent treatment of said phosphate.

One aspect of this invention relates to the preparation of a tetrapotassium pyrophosphate that is totally water-soluble. A common industrial method of forming tetrapotassium pyrophosphate is to react phosphoric acid, either furnace acid or wet process acid, with potassium hydroxide or potassium carbonate. This reaction yields dipotassium hydrogen phosphate, which is then heated and dehyrated to give the desired tetrapotassium pyrophosphate. As mentioned above, this method involves the reaction of the expensive potassium hydroxide or carbonate. Other methods of adding the potassium ion to phosphoric acid involve the addition of a material such as potassium chloride to phosphoric acid. This mixture, when used as a fertilizer, suffers the disadvantage of containing appreciable amounts of chloride ion. Chloride ion has a deleterious effect on a number of crops, such as tobacco and Idaho potatoes. Also, if the phosphoric acid is wet process acid, it contains congeneric metal impurities, such as iron and aluminum, that tend to precipitate when the acid is concentrated. Thus, a chloride-free and water-soluble high analysis fertilizer is desirable. This invention offers a process for making this type of fertilizer.

Another aspect of this invention relates to a method for incorporating micronutrients into the fertilizers that can be prepared as described herein.

The importance of micronutrients (or minor elements or trace elements) has only recently been recognized in the field of fertilizers. Among the difficulties involved in the incorporation of micronutrients into fertilizers are (1) uniform incorporation of the small amount of material, (2) prevention of segregation after mixing, and (3) reactions that can affect agronomic effectiveness and physical condition adversely. One of the techniques that has been previously devised is to charge a finely divided micronutrient material into a mixer, along with the principal materials, with 1 to 3 percent by weight of a white oil. The adherence of the micronutrients to the oil coating during mixing disperses the trace elements onto the fertilizer granules. By the method described herein for adding the desired micronutrients to the nitrate-phosphate mixture, denitrating the solution and calcining, not only can the micronutrients be simply and uniformly dispersed throughout the fertilizer, but the micronutrients are obtained in a substantially water-soluble form, making them completely useful and immediately available as plant food.

SUMMARY OF THE INVENTION

Halide-free alkali metal phosphates can be prepared by reacting a mixture of nitric and phosphoric acids with an alkali metal halide. The halogen-containing off gases can be separated and recovered, with the resulting solution comprising phosphate, nitrate and alkali metal ions. In one embodiment of this invention, alkali metal nitrates can be recovered from the solution by crystallization. In another embodiment of this invention, excess nitric acid can be evaporated and the remaining solution neutralized with ammonia to produce a high analysis fertilizer. In still another embodiment of this invention, substantially all nitrate can be driven off and an alkali metal phosphate suitable as fertilizer can be recovered. In yet another embodiment of this invention, substantially all nitrate can be removed, the residue can be calcined and a water-soluble alkali metal polyphosphate, useful as a fertilizer or a detergent, can be recovered. In still another embodiment, the solution comprising phosphate, nitrate and alkali metal ions can be mixed with a suitable micronutrient or mixture of micronutrients, substantially all nitrate can be removed, the residue can be calcined, and a water-soluble polyphosphate fertilizer containing micronutrients can be recovered.

The solution of nitric and phosphoric acids to which the alkali metal halide is added can come from any convenient source and is preferably substantially free of calcium. In one convenient embodiment, phosphate rock is acidulated with concentrated nitric acid to convert the phosphate rock to an acidulate comprising phosphoric acid, nitric acid and calcium nitrate in solution, as described in my co-pending application Ser. No. 725,139 which is hereby incorporated by reference. Subsequent to acidulation, calcium nitrate is removed from the resulting acidulate. This step is preferably performed by increasing the nitric acid content of the acidulate. Any fluorine compound found in the phosphate rock can, of course, be removed from the acidulate in known manner. Following separation of precipitated calcium nitrate, there is added to the filtrate, comprising phosphoric acid and nitric acid, an amount of alkali metal salt, such as KCl, necessary to furnish the desired ratio of $M_2O:P_2O_5$, where M is the alkali metal, in the final product. This $M_2O:P_2O_5$ ratio can vary from about 0.5:1 to about 3:1, so that from 1 to 6 moles of alkali metal halide can be added per mole of $P_2O_5$.

In the acidulation step it is desirable to use concentrated nitric acid, preferably having a concentration from about 75 to about 85 percent by weight nitric acid. The use of lower concentrations of nitric acid frequently causes the formation of excess gangue, while digesting with concentrations of nitric acid greater than about 85 percent proceeds rather slowly and results in losses of phosphoric acid, on the order of as much as 9 percent. Most preferably, nitric acid of from 80 to 85 percent by weight is employed. The temperature of the acidulation is not critical and can range from about 160° to about 240°F. In the acidulation step, it is desirable to use at least sufficient nitric acid to convert the phosphate rock to calcium nitrate and phosphoric acid. Preferably, an excess of up to about 15 percent by weight of nitric acid is used, based on the calcium present, calculated as calcium oxide. When employing a 10 to 15 percent excess of nitric acid, there is attained an acidulation ratio of from about 2.5 to 2.6 parts by weight of nitric acid per part of calcium calculated as calcium oxide. As previously indicated, calcium nitrate is removed from the acidulate, preferably by increasing the nitric acid content. There are several ways of increasing the nitric acid content of the acidulate, including the addition of more concentrated nitric acid or the formation of additional nitric acid in situ by the introduction of nitrogen oxides and oxygen into the acidulate. Where higher concentration nitric acid is added, the nitric acid added is preferably more concentrated than the nitric acid used to acidulate the rock. Thus, it is desirable that the added nitric acid be at least 90 percent by weight $HNO_3$, preferably greater than 95 percent and, most preferably, greater than 98% $HNO_3$ by weight. Alternatively, the nitric acid content in the acidulate can be increased by introducing one or more nitrogen oxides and oxygen into the acidulate. In a particularly preferred embodiment, the nitric acid concentration is increased until the water content of the supernatant solution is no more than about 14 percent by weight. Generally, the precipitation of calcium nitrate is substantially instantaneous. Upon completion of the precipitation, the solid and liquid phases can be separated by conventional means, such as decantation, filtration or, preferably, centrifugation. Such separation is readily achieved, and, as the liquid phase is of a low viscosity, the calcium nitrate crystals will settle rapidly. Following separation, the calcium nitrate cake can be washed, dried and used in any convenient manner. The supernatant liquid remaining after removal of the precipitated calcium nitrate is the preferred source of the solution of nitric and phosphoric acids to which the alkali metal halide is added.

The alkali metal cations which are useful within the scope of this invention can be selected from among lithium, sodium, potassium, rubidium and cesium, with sodium and potassium compounds being preferred because they are commercially available and relatively inexpensive. Potassium halides are particularly preferred because potassium is one of the necessary macronutrients, and its incorporation into a mixture containing available nitrogen and phosphorous makes a complete fertilizer available. The halide anions useful in this invention can be selected from among fluorine, bromine, chlorine and iodine compounds. Since alkali metal chloride compounds are commercially available and relatively inexpensive, they are preferred. Thus, potassium chloride is the particularly preferred alkali metal halide. The alkali metal halide employed can come from any of the usually available salts and can be of high or low purity. The alkali metal halide can be used in a solid form, preferably finely divided, or as a solution, as desired.

The reacting components can be combined and mixed in any convenient manner. It is often preferred to add the alkali metal halide to the mixed acids at a temperature below about 60°C., since there is practically no reaction at or below this temperature level. Thus, the slurry can be introduced into a closed system without giving off fumes that would be evolved at a higher temperature. The gases evolved as a result of the reaction with the preferred alkali metal chloride comprise chlorine, nitrogen dioxide and nitrosyl chloride. The gases can be recycled back through the solution and, where the concentration of nitric acid is sufficiently high, nitrosyl chloride can be oxidized to form nitrogen dioxide and chlorine. Alternatively, the gases can be passed through concentrated nitric acid to accomplish said oxidation. The resultant gases, comprising nitrogen dioxide and chlorine, can be recovered and readily separated by well-known fractionation techniques. The solution remaining can be treated in several ways.

In one embodiment alkali metal nitrate can be prepared by removing excess nitric acid from the above solution, as by boiling, and thereafter crystallizing the alkali metal nitrate from the solution.

In still another embodiment, the solution comprising alkali metal ions, nitric acid and phosphoric acid can be substantially denitrated, as by boiling. The remaining phosphoric acid solution can be appropriately neutralized, such as by the addition of ammonia, to yield a substantially chloride-free, high analysis mixed fertilizer. By adjusting the amounts of nitric acid, phosphoric acid, potassium chloride and ammonia, fertilizers having varying ratios of N-P-K can be obtained.

In still another embodiment, a metaphosphate-type fertilizer can be prepared. To the solution comprising nitric acid and phosphoric acid is added sufficient alkali metal halide to obtain an $M_2O:P_2O_5$ ratio (where M is the alkali metal) of approximately 1:1 which is characteristic of alkali metal metaphosphate. Excess nitrate can be driven off, as by boiling, and the residue, comprising alkali metal dihydrogen phosphate, is calcined to give a product comprising alkali metal metaphosphate.

In another embodiment the solution can be substantially denitrated, as by boiling, and the residue can be calcined at a temperature of from about 650°C. to about 800°C., for a period of from about 1 hour to about 2 hours, to form an alkali metal polyphosphate. In this embodiment, a ratio of $M_2O:P_2O_5$ of about 2:1 (where M is the alkali metal) is needed to yield a polyphosphate such as $M_4P_2O_7$. The conditions for calcining are well-known. The polyphosphates formed are substantially completely water-soluble, even in the presence of iron and aluminum congeneric metal impurities found in the phosphoric acid derived from the phosphate rock. Thus, this process has the advantages of making substantially chloride-free, substantially completely water-soluble high analysis P-K fertilizer. The product is quite desirable and is less expensive than polyphosphates from other processes.

In still another embodiment, micronutrients can be incorporated into the solution of phosphate, nitrate and alkali metal ions that remains after the removal of nitrogen dioxide and chlorine gases. The micronutrients most usually incorporated in fertilizers are boron, zinc, iron and manganese. Copper and molybdenum are less frequently used because deficiencies of these metals are usually less widespread than one those of the micronutrients described above. The following minimum percentages by weight of the more frequently employed micronutrients have been adopted as standard by some states and may be considered as typical of the amounts which can be incorporated in a fertilizer:

| | |
|---|---|
| B | 0.02 |
| Fe | 0.10 |
| Mn | 0.05 |
| Zn | 0.05 |

That the micronutrient content must be carefully controlled can be seen from the fact that the range between inadequate and toxic amounts of many micronutrients is fairly small. The principal micronutrients are usually added in the form of borax and the sulfates of the other metals, although other compounds can be used. In accordance with the embodiment described above, the micronutrients, for example, in the form of powdered borax and sulfates of the metals, can be added to the acid solution in sufficient amount to satisfy the proposed minimum requirements of the locale in which they are to be used, thereafter substantially denitrating the resulting solution, as by boiling, and thereafter calcining the residue at a temperature and for a period of time sufficient to form an alkali metal polyphosphate matrix containing the micronutrients. The calcined product is substantially completely water soluble.

In still another embodiment, the fertilizer comprising a mixture of micronutrients dispersed in the alkali metal phosphate fertilizer base, prepared as described above, can be combined or mixed with the complete fertilizer formed by the ammoniation of the alkali metal phosphate base. By proper adjustment and manipulation of the various components, a commercially valuable complete fertilizer containing micronutrients can readily be obtained, with the kind and concentration of micronutrients, as well as the N-P-K ratio, being variable upon demand.

DESCRIPTION OF THE PREFERRED EMBODIMENTS

EXAMPLE I

Phosphate rock, containing approximately 30 percent by weight $P_2O_5$ and approximately 47 percent by weight calcium (measured as calcium oxide) was crushed to a particle size that substantially passed through a 30 Tyler Mesh screen. Nitric acid was then added to stoichiometric crushed rock, with the acid concentration being about 80 percent by weight and the amount of acid being about 10 percent in excess of the stiochiometric amount needed to produce calcium nitrate and phosphoric acid. After the phosphate rock was digested for about 2 hours at a temperature of about 160°F., concentrated nitric acid (approximately 95 percent by weight $HNO_3$) was added in an amount such that the water content of the supernatant solution was less than about 14 percent by weight. The calcium nitrate which precipitated was removed by filtration. The filtrate analyzed 62.33% $N_2O_5$, 8.55% $P_2O_5$ and 0.53% CaO. Potassium chloride was added to this filtrate so as to furnish a 1:1 ratio of $K_2O:P_2O_5$ in the final product. The potassium chloride-nitric acid-phosphoric acid mixture was then heated to boiling, evolving halogen-containing off-gases. The solution resulting from this treatment comprised phosphate, nitrate, potassium and hydrogen ions. Excess nitric acid was evaporated from the solution until the residue was substantially a solution of potassium nitrate in phosphoric acid. Cooling of this solution resulted in the precipitation of crystalline potassium nitrate.

EXAMPLE II

A solution of potassium, hydrogen, nitrate and phosphate ions prepared as described in Example I was denitrated by evaporation to dryness, resulting in a residue comprising $KH_2PO_4$. Calcining of this residue at 425°C. for a period of about 1 hour gave a product comprising $KPO_3$ and analyzing 37.78% $K_2O$, 50.2% $P_2O_5$ and 1.15% N, or about 89% total plant food.

EXAMPLE III

Water-soluble fertilizers were prepared as follows: To a portion of the filtrate solution obtained as described in Example I was added KCl to provide about 2 moles $K_2O$ per mole $P_2O_5$. The off-gases were removed and the solution was concentrated by boiling. This solution was evaporated to dryness and the residue heated to 740°C. for one-half hour. The product analyzed 40.1% $P_2O_5$, 55.54% $K_2O$ and 0.01% nitrogen and was substantially completely water soluble, in spite of the presence of such congeneric metals as iron and aluminum. X-ray diffraction confirmed its structure as substantially $K_4P_2O_7$.

EXAMPLE IV

A water-soluble fertilizer containing soluble micronutrients can be prepared as follows:

To a portion of the filtrate solution of nitric and phosphoric acids prepared as described in Example I is added sufficient KCl to provide a $K_2O:P_2O_5$ ratio of 2:1. To this solution, after removal of volatile gases, are added the micronutrient compounds. Thus, to sufficient filtrate solution to provide one hundred lbs., dry basis, of potassium phosphate, are added a powdered mixture of 0.178 lb. borax, 0.203 lb. manganous sulfate tetrahydrate and 0.22 lb. zinc sulfate heptahydrate. After boiling until dry and calcining at 740°C. for one hour, a water-soluble product is obtained.

When wet process phosphoric acid is used, as is the case in the above examples, the addition of iron, in the form of ferrous sulfate, is generally unnecessary insofar as the wet process acid often contains 1 percent or more iron, calculated as $Fe_2O_3$.

A fertilizer containing micronutrients prepared as described above can be applied directly or can be mixed with a fertilizer not containing such micronutrients and blended so as to obtain a fertilizer whose properties can be tailored for a specific use.

I claim:

1. A method for making substantially halide-free metal phosphates which comprises;
   a. reacting an alkali metal halide with a mixture of nitric and phosphoric acids in which the concentration of said mixture is from about 55 percent wt. to about 70 percent wt. nitric acid and less than about 14 percent water,
   b. separating the halogen-containing off-gases, and
   c. recovering a solution containing phosphate, nitrate and alkali metal ions.

2. A method according to claim 1 in which the nitric acid concentration is sufficient to oxidize at least part of the halide reaction products to free halogen.

3. A method according to claim 2 in which at least part of the halogen-containing off-gases are recycled through the solution.

4. A method according to claim 1 in which the alkali metal halide is added in an amount such that the resultant $M_2O:P_2O_5$ mole ratio, where M is alkali metal, lies in the range of from about 0.5:1 to about 3:1.

5. A method according to claim 1 in which the alkali metal halide is potassium chloride.

6. A method according to claim 1 in which the solution recovered is heated to evaporate excess nitric acid and then neutralized with ammonia to produce a substantially halide-free fertilizer.

7. A method according to claim 1 in which the solution recovered is treated to drive off substantially all nitrates, and an alkali metal phosphate residue is recovered.

8. A method according to claim 7 in which the phosphate residue recovered comprises about 89 percent total plant food.

9. A method according to claim 1 in which the solution recovered in step (c) is treated to remove halogen values and nitrates and then calcined to convert at least part of the phosphate present to the polyphosphate form.

10. A method according to claim 9 in which the alkali metal halide is potassium chloride, added in an amount of from about 2 to about 6 moles of KCl per mole of $P_2O_5$, the solution is boiled to remove chloride and water and the residue obtained thereby is calcined at a temperature of about 740°C. for from 1 to 2 hours.

11. A method according to claim 10 in which the calcined product is characterized by substantial freedom from chloride, nitrate and calcium and by being substantially water soluble.

12. A method according to claim 1 in which plant micronutrients are added to the solution recovered in step (c), the solution is heated to remove halogen values, excess water and nitrates, and the residue obtained thereby is calcined to convert at least part of the phosphate therein to polyphosphate.

13. A method according to claim 12 in which the alkali metal halide is potassium chloride, added in an amount of from about two to about six moles of KCl per mole of $P_2O_5$, the solution is boiled to remove water, chlorine values and nitrates, and the residue is calcined at a temperature of from about 650°C. to about 800°C. for a period of from about one-half to about 2 hours.

14. A method according to claim 13 in which the product obtained is characterized by substantially complete water solubility.

* * * * *